(12) United States Patent
Gout et al.

(10) Patent No.: US 10,423,872 B2
(45) Date of Patent: Sep. 24, 2019

(54) OBJECT IDENTIFICATION DEVICE, SYSTEM, AND METHOD

(71) Applicants: SPACECODE, Verrieres-le-Buisson (FR); WINSTEAD ASSETS, Roadtown, Tortola (VG)

(72) Inventors: Eric Gout, Verrieres-le-Buisson (FR); Christophe Raoult, Verrieres-le-Buisson (FR)

(73) Assignees: SPACECODE, Verrieres-le-Buisson (FR); WINSTEAD ASSETS, Roadtown, Tortola (VG)

( * ) Notice: Subject to any disclaimer, the term of this patent is extended or adjusted under 35 U.S.C. 154(b) by 0 days.

(21) Appl. No.: 15/774,425

(22) PCT Filed: Nov. 8, 2016

(86) PCT No.: PCT/EP2016/077026
§ 371 (c)(1),
(2) Date: May 8, 2018

(87) PCT Pub. No.: WO2017/077140
PCT Pub. Date: May 11, 2017

(65) Prior Publication Data
US 2018/0322377 A1   Nov. 8, 2018

(30) Foreign Application Priority Data
Nov. 8, 2015 (EP) ..................................... 15193569

(51) Int. Cl.
*G06K 19/06* (2006.01)
*G06K 19/077* (2006.01)
*G06K 19/07* (2006.01)

(52) U.S. Cl.
CPC ... *G06K 19/07767* (2013.01); *G06K 19/0709* (2013.01); *G06K 19/07703* (2013.01); *G06K 19/07788* (2013.01)

(58) Field of Classification Search
CPC ............ G06K 19/07749; G07F 7/1008; G06Q 20/341
(Continued)

(56) References Cited

U.S. PATENT DOCUMENTS 6,925,439 B1* 8/2005 Pitroda .................. G06Q 20/02
                                                    235/380
2006/0213972 A1* 9/2006 Kelley ................. G06K 7/0008
                                                    235/380
(Continued)

FOREIGN PATENT DOCUMENTS

CN       103532598 A    1/2014
CN       204009990 U   12/2014
(Continued)

OTHER PUBLICATIONS

International Search Report and Written Opinion dated Feb. 13, 2017, for International Patent Application No. PCT/EP2016/077026.

*Primary Examiner* — Ahshik Kim
(74) *Attorney, Agent, or Firm* — Karceski IP Law, PLLC

(57) ABSTRACT

An object identification device includes a visual indicator, an RFID module, and an NFC assembly. The RFID module includes identification data. The RFID module harvests power from an electromagnetic field and may continuously direct that power to the visual indicator upon reception of a command conveyed by the electromagnetic field. The NFC assembly includes data associated with the identification data included in the RFID module. The NFC assembly may (Continued)

transmit the data included therein to a consumer communication device having NFC capabilities.

8 Claims, 7 Drawing Sheets

(58) Field of Classification Search
USPC .......................................................... 235/492
See application file for complete search history.

(56) References Cited

U.S. PATENT DOCUMENTS

2008/0308641 A1* 12/2008 Finn .................. G06K 19/0723
235/492
2012/0105210 A1    5/2012 Smith et al.
2014/0319227 A1   10/2014 Folcke et al.

FOREIGN PATENT DOCUMENTS

| CN | 204117184 U | 1/2015 |
| CN | 204242234 U | 4/2015 |
| CN | 204706053 U | 10/2015 |
| EP | 1911125 A2 | 4/2008 |

\* cited by examiner

OBJECT IDENTIFICATION DEVICE, SYSTEM, AND METHOD

CROSS-REFERENCE TO RELATED APPLICATION(S)

This is a National Stage Entry into the United States Patent and Trademark Office from International PCT Patent Application No. PCT/EP2016/077026, having an international filing date of Nov. 8, 2016, which claims priority to European Patent Application No. 15193569.9, filed on Nov. 8, 2015, the entire contents of both of which are incorporated herein by reference.

FIELD OF THE INVENTION

An aspect of the invention relates to an object identification device. The object identification device may be used, for example, in the field of gemstones and jewelry, in particular diamonds. Another aspect of the invention relates to a method of working on objects, such as, for example, gemstones and jewelry, in an added value chain, which may extend from a source to a final user and owner. This method may involve an object identification device. Yet another aspect of the invention concerns an object identification system adapted to communicate with an object identification device so as to, for example, retrieve data from such a device or to cause the device to produce an indication that may facilitate the working on an object that is associated with the device. An entity in an added value chain in the field of, for example, gemstones and jewelry, in particular diamonds, may use such a system and carry out such a method.

BACKGROUND OF THE INVENTION

An object identification device may be in the form of a so-called RFID tag, RFID being an acronym of Radio Frequency Identification Device. Patent publication US 2014/0319227A1 describes an electronic tag comprising a reception circuit for receiving signals from a base station at a given frequency, which may be less than 200 kHz. The reception circuit comprises an antenna of which the resonance frequency is at least twice the given frequency of the signals received from the base station. In the electronic tag, a processor circuit may process the signals received from the base station so as identify a query to which the electronic tag should reply. A transmission circuit may transmit modulated signals at a frequency different from the given frequency of the signals received from the base station.

SUMMARY OF THE INVENTION

There is a need for solutions that allow improvements in object identification devices, systems, and methods that facilitate working on objects with enhanced reliability and certainty.

In order to better address this need, in accordance with an aspect of the invention, there is provided an object identification device as defined in claim 1, which is appended to the description. This object identification device may significantly facilitate working on an object that is associated with the device and provide enhanced reliability and certainty in this working. This particularly applies, for example, in case the object is a gemstone, a jewel, notably a diamond.

For the purpose of illustration, a detailed description of some embodiments of the invention is presented with reference to accompanying drawings.

DETAILED DESCRIPTION

Figure 1:
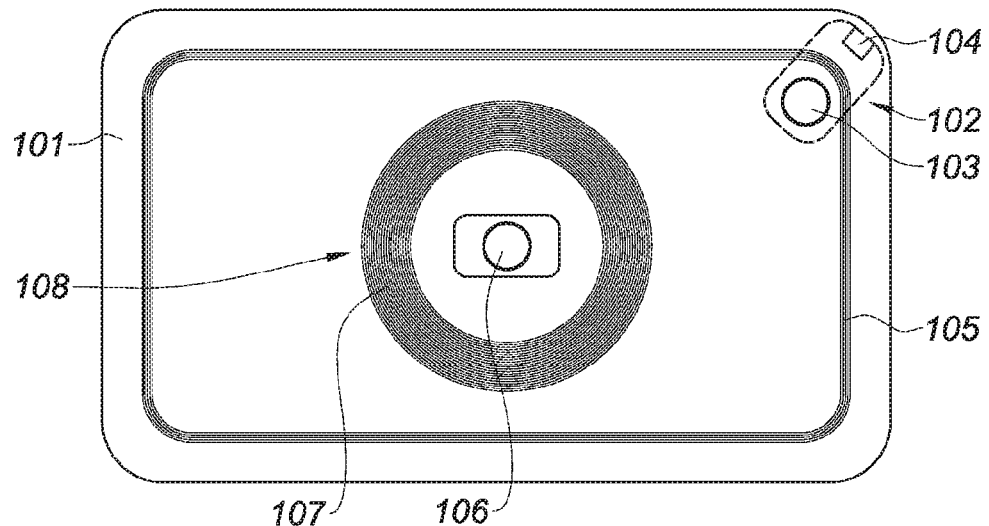
FIG. 1 is a schematic diagram of a first embodiment of an object identification device.

FIG. 1 schematically illustrates a first embodiment 100 of an object identification device. This first embodiment 100 may be associated with an object, such as, for example, a gemstone, a jewel, in particular a diamond. This association may be in the form of, for example, a physical link between the first embodiment 100 and the object, which may be a diamond. In the sequel, it is assumed that the object is a diamond for reasons of illustration.

The first embodiment 100 may be in the form a card 101 that may have the shape, the geometry, and the appearance of a so-called smart card, or a card similar thereto, such as a credit card. The card 101 incorporates an RFID module 102, which comprises an RFID chip 103 and a LED 104, which is electrically coupled to the RFID chip 103. LED is an acronym for Light Emitting Diode. The term "chip" may designate an integrated circuit. The RFID module 102 may be in the form of, for example, a so-called Chip-on-Board assembly, which will hereinafter be designated as COB assembly. The LED 104 may be located in a corner of the card 101.

The card 101 further incorporates an RFID antenna 105, which is electrically coupled to the RFID chip 103. The RFID antenna 105 may have circumference that is relatively close to that of the card 101. That is, the RFID antenna 105 may enclose an area that is almost as large as a main side of the card 101. In the first embodiment 100, the RFID antenna 105 overpasses the RFID module 102 in between the RFID chip 103 and the LED 104.

In FIG. 1, the RFID chip and the RFID antenna are designated as LF chip and LF antenna hereinafter, respectively. LF is an acronym for Low Frequency. The RFID chip 103 and the RFID antenna 105 may indeed operate in a relatively low frequency range comprised between, for example, 50 and 250 kHz. More specifically, the RFID chip 103 and the RFID antenna 105 may operate according to principles described in patent publication US 2014/0319227A1, which is incorporated by reference herein. These principles of operation are particularly suitable for RFID in the field of gemstones and jewelry, in particular diamonds.

The card 101 further incorporates an NFC chip 106 and an NFC antenna 107, NFC being an acronym for Near Field Communication. The NFC chip 106 and the NFC antenna 107 are electrically coupled with each other to form a NFC assembly 108. The NFC chip 106 may be mounted on a COB assembly, which may further comprise antenna connections. The NFC antenna 107 may be located within an area enclosed by the RFID antenna 105, as shown in FIG. 1. The NFC antenna 107 may have a central location on the card 101. In the first embodiment 100, the NFC chip 106 may also have a central location.

The RFID chip 103 may comprise an identification data relating to the diamond. The NFC chip 106 may also comprise identification data, which may correspond with the identification data in the RFID chip 103 or which may be identification data relating to the RFID chip 103. The identification data in the RFID chip 103 and that in the NFC chip 106 may be linked in another fashion. For example, a link can be made in a database external to the first embodiment 100, such as, for example, a database on a server.

The NFC chip 106 may further comprise other information relating to the diamond. For example, this information may pertain to the provenance of the diamond, its characteristics, entities that have worked on the diamond, as well as certification data. Alternatively, or in addition, the NFC chip 106 may comprise a link that allows retrieving such information from an external data storage entity, such as, for example, a server, which may be accessed through the Internet. The information relating to the diamond can be constituted in a piecemeal fashion by various entities that work on the diamond. This information may present a detailed, interesting story, as it were, for a final owner of the diamond.

Data that is comprised in the RFID chip 103 may be read from a relatively long distance. This particularly applies in case the RFID chip 103 operates in a relatively low frequency range, as the one mentioned hereinbefore. However, reading this data may require a specific system that may typically not be present in ubiquitous consumer communication devices, such as, for example, smart phones and the like.

In contrast, data that is comprised in the NFC chip 106 may be read from a relatively short distance only. However, since numerous consumer communication devices have NFC communication capabilities, the data in the NFC chip 106 can be readily accessed. For example, the final owner of the diamond to which the object identification device is physically linked may use his or her smart phone to retrieve data from the NFC chip 106 and, thereby, detailed, interesting information on the diamond, as explained hereinbefore. The object identification device may thus remain physically linked to the diamond until the diamond arrives at the final owner. The object identification device may thus constitute a valued, useful accessory to the diamond, in particular when the final owner receives the diamond as a gift.

Since the card 101 incorporates the RFID chip 103 as well as the NFC chip 106, it is possible to retrieve corresponding data pertaining to the diamond by reading one or the other chip. As indicated hereinbefore, this data may be retrieved from an external database on the basis of identification data, or link-specifying data that is comprised in at least one of these chips.

Moreover, assuming the diamond is physically linked to the card 101, the card 101 allows visually identifying the diamond in a batch of objects, for example, a collection of diamonds, of which the diamond forms part. This is because the RFID chip 103 is capable of directing all power, or at least nearly all power, that the RFID antenna 105 may harvest from an electromagnetic field to the LED 104. The LED 104 may then continuously emit light, as will be explained in greater detail hereinafter.

Figure 2:
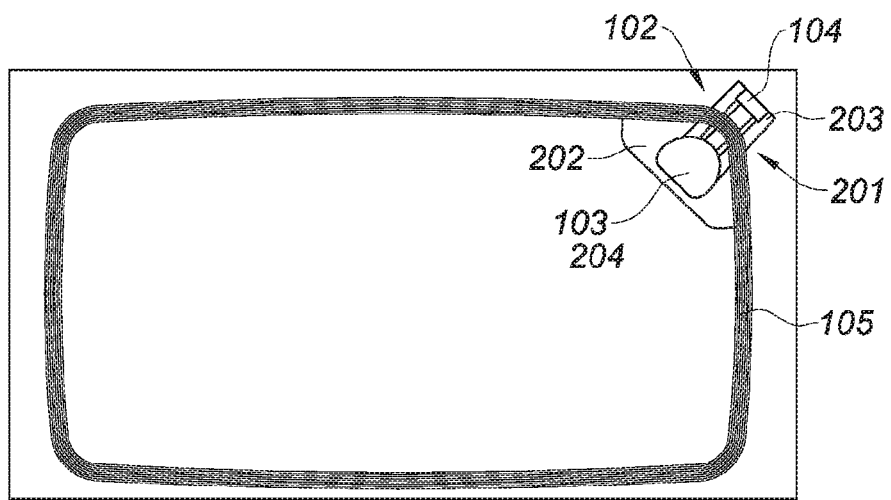
FIG. 2 is a pictorial diagram of an experimental setup related to the first embodiment of the object identification device.

FIG. 2 illustrates an experimental setup 200 related to the first embodiment 100 of the object identification device. This figure provides a pictorial diagram of this experimental setup. In this figure, the RFID antenna 105 is visible as well as the RFID module 102 in the form of a COB assembly 201. The RFID antenna 105 overpasses the COB assembly 201 so that two COB assembly sections 202, 203 can be distinguished. One section 202 is triangular shaped, the other one 203 is rectangular shaped. The RFID chip 103 is located in the triangular shaped section 202 of the COB assembly 201 under a protective epoxy layer 204 in the shape of a dome. The rectangular shaped section 203 of the COB assembly 201 comprises the LED 104. The NFC chip 106 and the NFC antenna 107 are not included in the experimental setup illustrated in FIG. 2.

Figure 3:
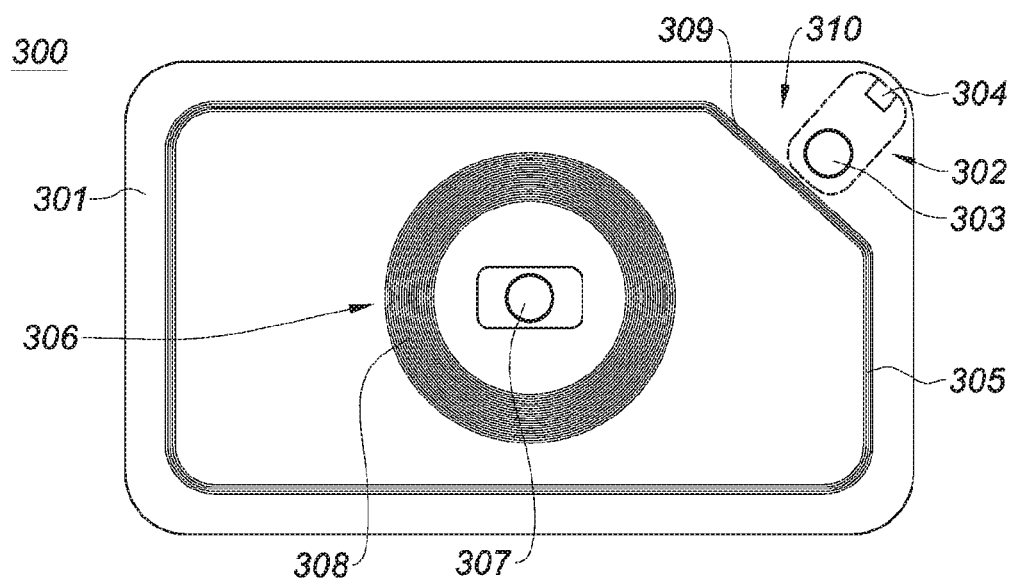
FIG. 3 is a schematic diagram of a second embodiment of an object identification device.

FIG. 3 schematically illustrates a second embodiment 300 of an object identification device. This second embodiment 300 is also in the form of a card 301 and comprises various elements that have been described hereinbefore: an RFID module 302 including an RFID chip 303 and a LED 304, an RFID antenna 305, and an NFC assembly 306 including an NFC chip 307 and an NFC antenna 308. In the second embodiment 300, the RFID antenna 305 bypasses the RFID module 302. Compared with the first embodiment 100 illustrated in FIG. 1, the RFID antenna 305 of the second embodiment 300 has a slanted segment 309 that leaves a triangular shaped portion 310 of the card 301 in which the RFID module is located. For the rest, remarks made hereinbefore with regard to the first embodiment 100 may equally apply to the second embodiment 300.

Figure 4:
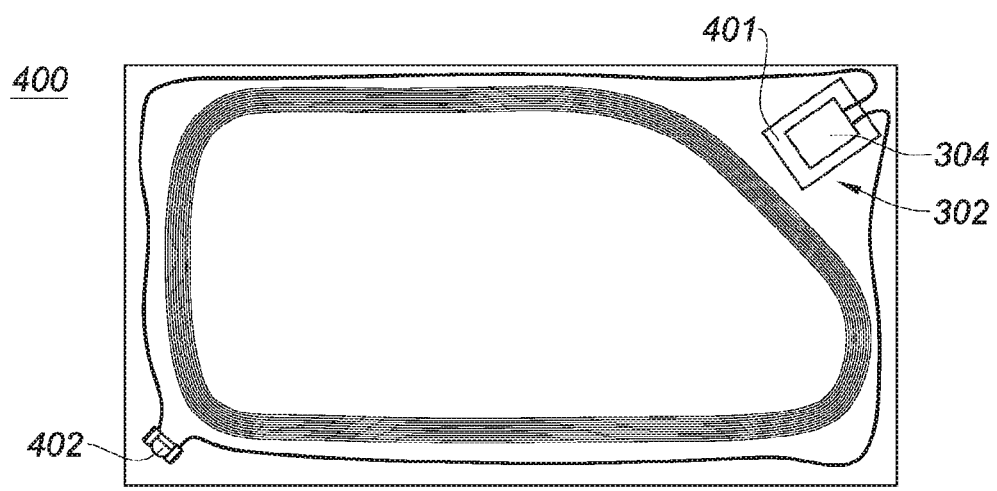
FIG. 4 is a pictorial diagram of an experimental setup related to the second embodiment of the object identification device.

FIG. 4 illustrates an experimental setup 400 related to the second embodiment 300 of the object identification device. This figure provides a pictorial diagram of this experimental setup. The RFID module 302 is in the form of a rectangular shaped COB assembly 401 that includes the LED 304. The experimental setup illustrated in FIG. 4 comprises an additional LED 402, which is located in a corner of the card opposite to that where the first mentioned LED 304 on the COB assembly is located. The additional LED 402 may improve visual identification of the card and, therefore, the diamond that is physically linked thereto.

Figure 5:
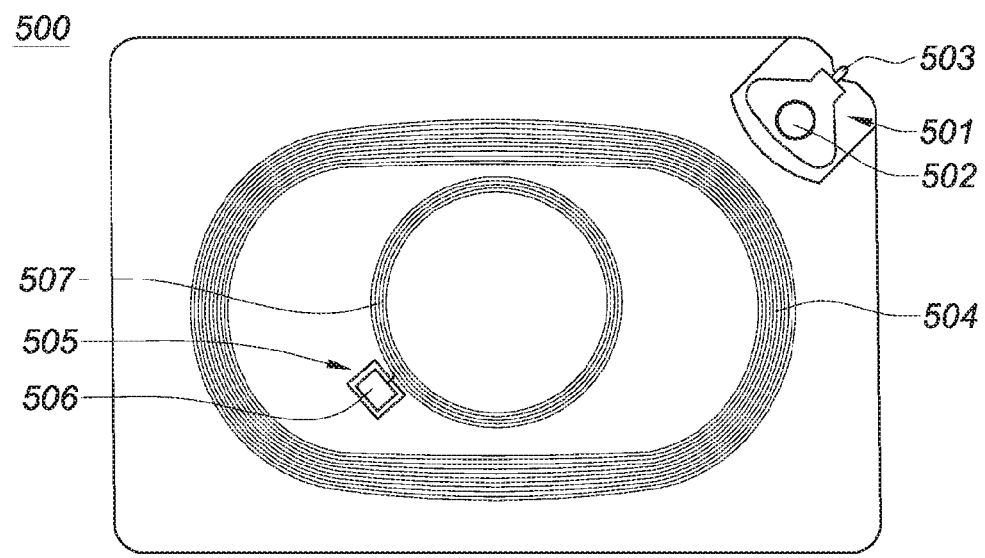
FIG. 5 is a pictorial front view of a prototype based on the second embodiment of the object identification device.
Figure 6:
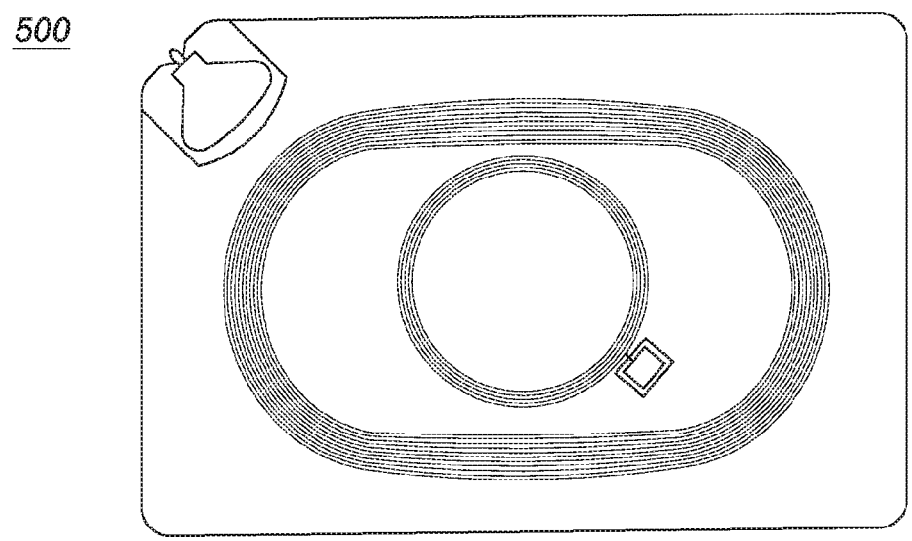
FIG. 6 is a pictorial rear view of the prototype based on the second embodiment of the object identification device.

FIGS. 5 and 6 illustrate a prototype 500 based on the second embodiment 300 of the object identification device. FIG. 5 provides a pictorial front view of the prototype 500. FIG. 6 provides a pictorial rear view of the prototype 500. The prototype 500 comprises various elements hereinbefore: an RFID module 501 including an RFID chip 502 and a LED 503, an RFID antenna 504, and an NFC assembly 505 including an NFC chip 506 and an NFC antenna 507. The prototype 500 is based on the second embodiment 300 illustrated in FIG. 3 in the sense that the RFID antenna 504 bypasses the RFID module. Some differences can be noted. The RFID antenna 504 of the prototype 500 encloses a smaller portion of the card compared with the RFID antenna of the second embodiment 300 schematically illustrated in FIG. 3. In the prototype 500, the NFC chip 506 is located outside an area enclosed by the NFC antenna 507, whereas, in FIG. 3 the NFC chip is located inside this area. These differences illustrate that there are numerous different manners of implementing an object identification device in accordance with the invention.

Figure 7:
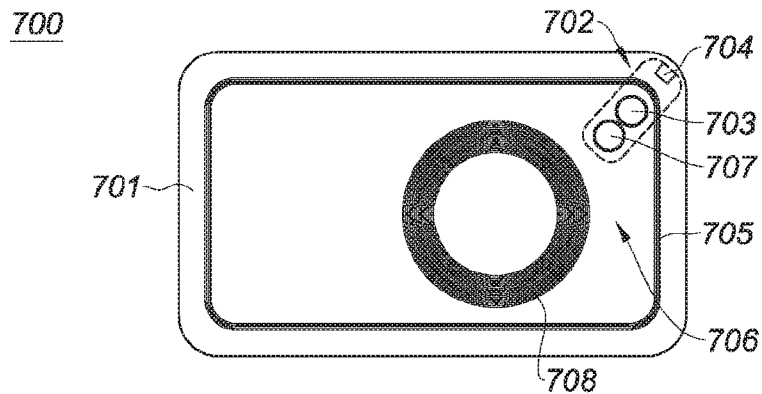
FIG. 7 is a schematic diagram of a third embodiment of an object identification device.

FIG. 7 schematically illustrates a third embodiment 700 of an object identification device. This third embodiment 700 is also in the form of a card 701 and comprises various elements that have been described hereinbefore: an RFID module 702 including an RFID chip 703 and a LED 704, an RFID antenna 705, and an NFC assembly 706 including an NFC chip 707 and an NFC antenna 708. In the third embodiment 700, the RFID chip 703, the LED 704 and the NFC chip 707 are comprised in a single COB assembly. A further difference with the first embodiment 100 illustrated in FIG. 1, is that the NFC chip 707 is located outside an area enclosed by the NFC antenna 708, whereas, in FIG. 1 the NFC chip is located inside this area. For the rest, remarks made hereinbefore with regard to the first embodiment 100 may equally apply to the third embodiment 700.

Figure 8:
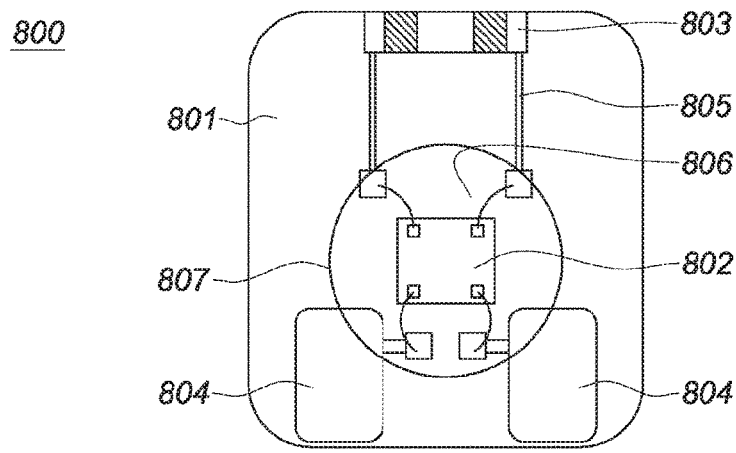
FIG. 8 is a block diagram of an RFID module, which may be applied in an object identification device.

FIG. 8 schematically illustrates an RFID module 800 that may be applied in an object identification device, in particular one according to the first or the second embodiments 100, 300 described hereinbefore. FIG. 8 provides a block diagram of the RFID module 800. The RFID module 800 is in the form of a COB assembly 801 and comprises elements that have been described hereinbefore: an RFID chip 802 and a LED 803. The RFID module 800 further comprises a pair of antenna connection pads 804 and a pair of LED connection tracks 805 on a substrate. The LED connection tracks may be sufficiently long to allow an RFID antenna over passing these tracks and thus over passing the RFID module 800, as in the first embodiment 100 illustrated in FIG. 1.

The RFID chip 802 has a pair of LED bond pads that is electrically coupled to the pair of LED connection tracks 805 by means of a pair of wire bonds 806. The RFID chip 802 further has a pair of antenna bond pads that is electrically coupled to the pair of antenna connection pads by means of a pair of wire bonds. The RFID chip 802 and the aforementioned wire bonds are covered by a protective epoxy layer 807, which may have the shape of a dome.

Figure 9:
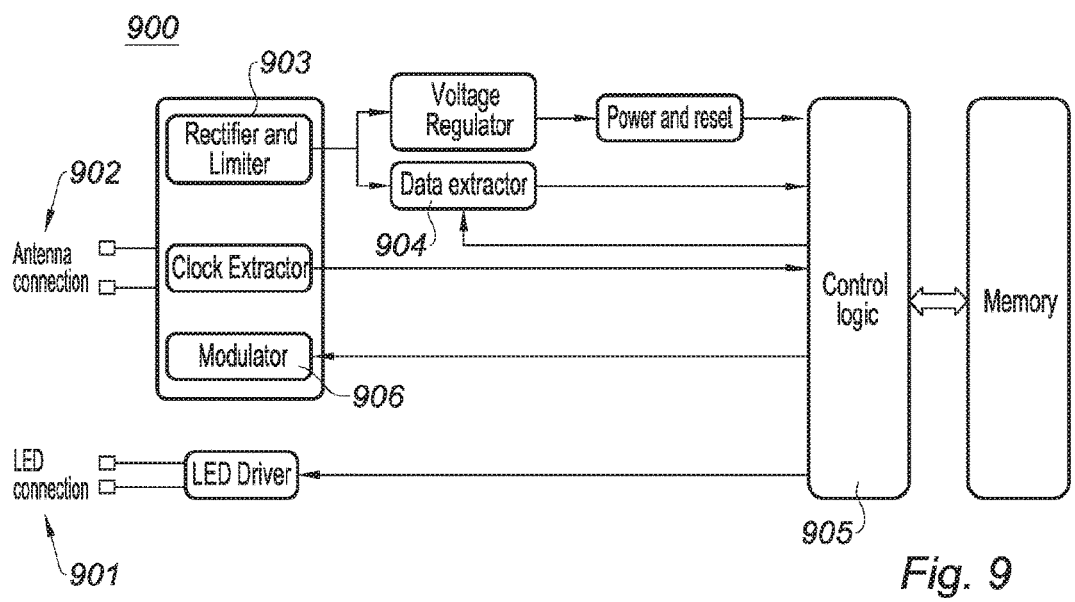
FIG. 9 is a block diagram of an RFID chip, which may be applied in an RFID module.

FIG. 9 illustrates an RFID chip 900, which may correspond with the RFID chip 802 in the module illustrated in FIG. 8 and with the RFID chip in any of the embodiments of the object identification device described hereinbefore. FIG. 9 provides a block diagram of the RFID chip 900. The RFID chip 900 has a pair of LED connections 901 that may correspond with the LED bond pads shown in FIG. 8. The RFID chip 900 further has a pair of antenna connections 902 that may correspond with the pair of antenna bond pads illustrated in FIG. 8. The RFID chip 900 comprises various functional blocks that are designated in FIG. 9 by descriptive terms.

The RFID chip 900 may operate as follows. An AC signal may be present on the pair of antenna connections 902 in case an RFID antenna, which is coupled to these connections, receives an electromagnetic field. A reader device in an object identification system may generate such a field and, moreover, modulate the field to send commands. A functional block designated "Rectifier and Limiter" 903 may provide a DC power supply voltage by rectifying the AC signal that is present on the pair of antenna connections 902. The RFID chip 900 thus harvests, in effect, electrical power from the electromagnetic field that may be applied to various circuits in the RFID chip 900. The RFID chip 900 runs on this harvested electrical power.

A functional block designated "Data Extractor" 904 may extract data from the AC signal, in particular commands from the reader device. The functional block designated "Control logic" 905 may interpret and execute such commands. The Control logic 905 may generate a response for the reader device. A functional block designated "Modulator" 906 may modulate the electromagnetic field in accordance with this response. The response may be transmitted at a frequency which is a sub multiple of a main frequency of the electromagnetic field, according to principles described in patent publication US 2014/0319227A1.

The reader device in the object identification system may send a LED activation command. In response to this command, the Control logic 905 directs all the harvested electrical power, or at least nearly all the harvested electrical power, to a LED that is coupled to the pair of LED connections 901. This allows the LED light up continuously; the LED produces continuous light thanks to all the harvested electrical power that is directed to the LED.

Figure 10:
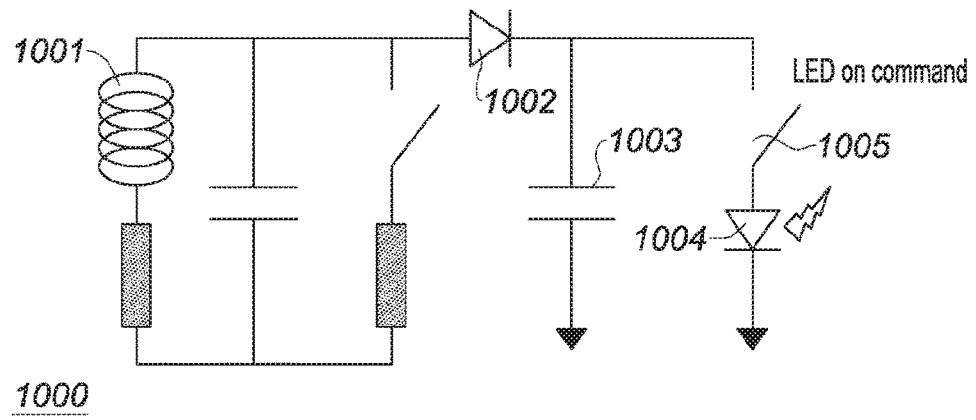
FIG. 10 is a schematic power supply circuit diagram circuit that exemplifies power supply management in an RFID chip.

FIG. 10 schematically illustrates a power supply circuit 1000 that exemplifies power supply management in the RFID chip 900 illustrated in FIG. 9, as well as those illustrated in other embodiments. The power supply circuit 1000 comprises a coil 1001 that may correspond with an RFID antenna coupled to the pair of antenna connections 902 of the RFID chip 900 illustrated in FIG. 9. A horizontally oriented diode 1002 followed by a capacitance 1003 corresponds with the Rectifier and Limiter 903 from which harvested electrical power can be drawn. A vertically oriented LED 1004 may correspond with a LED coupled to the pair of LED connections 901 of the RFID chip 900 illustrated in FIG. 9. A switch 1005 coupled in series with the LED may correspond with the Control logic 905, or at least a control operation that this functional block carries out. Upon reception of a "LED on" command, the switch 1005 is closed, which allows the LED 1004 to consume a major portion of the harvested electrical power.

In case all harvested electrical power, or at least nearly all harvested electrical power, is consumed by the LED 1004, this may cause a drop in the DC power supply voltage within the RFID chip 900. Moreover, this may prevent circuits in the RFID chip 900 from functioning correctly and reliably. Specifically, the Control logic 905 shown in FIG. 9 may no longer be capable of correctly and reliably interpreting and executing a command, or generating a response, or both. A communication between the reader device and the RFID chip 900 and may no longer be reliable, or may even no longer be possible. However, this need not be a significant problem.

The LED 1004 is typically made to light up in order to visually identify the object identification device of which the LED 1004 forms part. This lighting up is, in many practical cases, done in order to take out from a batch the diamond that is physically linked with the object identification device, or to assure that the diamond is present in the batch. This operation or verification does not require further communication between reader device and the RFID chip 900. Once the operation or verification has been carried out, communication between reader device and the RFID chip 900 can be restored in the following manner.

For example, the object identification system may receive an indication that an operation or a verification for which the LED 1004 has been made to light up has been completed. This indication may be in the form of, for example, a user actuating an element of a user interface that signals that the operation or verification has been completed. In response, the object identification system may cause the reader device to interrupt generation of the electromagnetic field or, at least, to temporarily reduce the electromagnetic field in strength.

This interruption of the electromagnetic field may cause a reset of the RFID chip 900, which, referring to FIG. 10 causes the switch 1005 in series with the LED 1004 to be open again. This switch 1005 may have an open state as default state: if no electrical power is harvested, or insufficient electrical power, the switch 1005 is open. Consequently, when the interruption of the electromagnetic field has ended, the harvested electrical power may again be available for the circuits within the RFID chip 900, so that the communication between reader device and the RFID chip 900 may be restored.

Alternatively, the object identification system may automatically cause an interruption in the electromagnetic field after having sent a "LED on" command. There may be a defined delay between the sending of this command and the interruption. This delay may be programmable. The object identification system may allow a user to define or suitable delay, which determines a period of time during which LEDs of object identification modules may light up.

Figure 11:
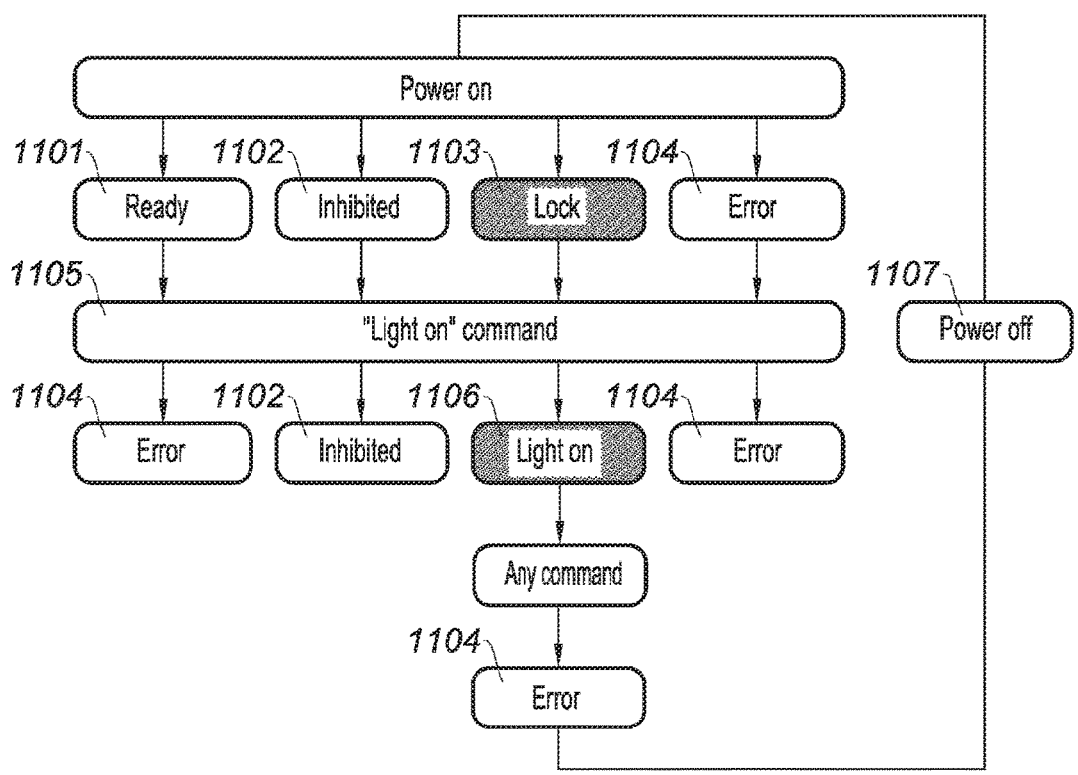
FIG. 11 is a state diagram of a logic circuit controlling a LED in an object identification device.

FIG. 11 illustrates a method 1100 of controlling a LED, which may involve the Control logic 905 shown in FIG. 9. FIG. 11 is a state diagram that may apply to the Control logic 905. The Control logic 905 may have various states: a ready state 1101, an inhibited state 1102, a lock state 1103, and an error state 1104. FIG. 11 illustrates what happens when the Control logic 905 receives a LED (light) on command 1105 for each of these states. In case the Control logic 905 is in the ready state 1101 when receiving the LED on command 1105, this will cause the Control logic 905 to arrive in the error state 1104. In case the Control logic 905 is in the inhibited state 1102 when receiving the LED on command, this will cause the Control logic 905 to remain in the inhibited state 1102. In case the Control logic 905 is in the error state 1104 when receiving the LED on command 1105, this will cause the Control logic 905 to remain in the error state.

In this example, it is only in case the Control logic 905 is in the lock state 1103, that the Control logic 905 will cause the LED to light up 1106 upon reception of the LED on command 1105. Any further command may cause the Control logic 905 to arrive in the error state 1104 while the LED may still light up. In FIG. 11, a "Power off" 1107 represents an interruption in the electromagnetic field. This interruption will bring the Control logic 905 in the ready state 1101. One or more subsequent commands may bring the Control logic 905 in the lock state 1103, where the LED can be made to light up upon sending a LED on command 1105.

Figure 12:
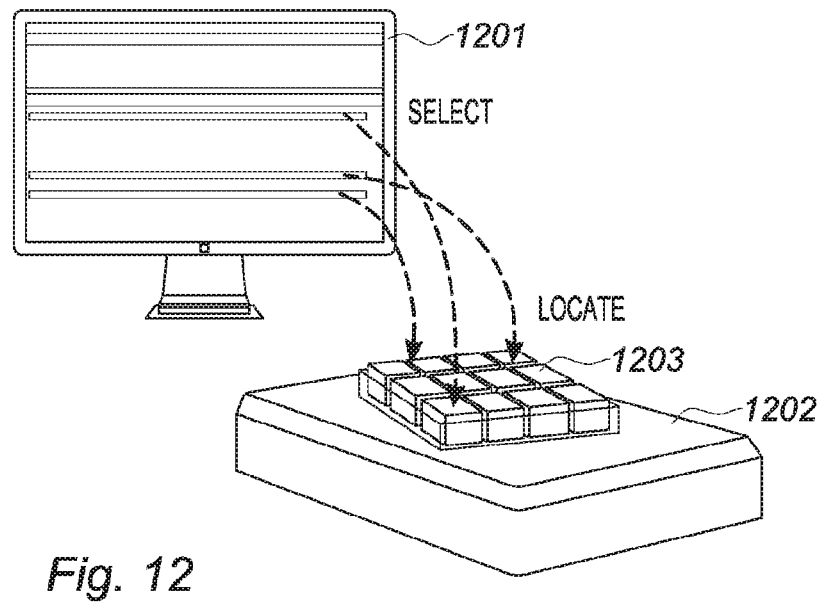
FIG. 12 is a schematic pictorial perspective view of an object identification system.

FIG. 12 schematically illustrates an object identification system 1200. This figure provides a pictorial perspective view of parts of the system 1200. The object identification system 1200 may be used to efficiently and reliably work on a batch of diamonds. Each diamond may be physically linked with an object identification device according to at least one of the embodiments described hereinbefore. The work on these diamonds may involve operations, such as, for example, locating one or more diamonds that meet one or more criteria, counting these diamonds and sorting diamonds according to one or more criteria.

The object identification system 1200, which pictorially and schematically illustrated in FIG. 12, comprises a user interface and a controller. These functional entities are jointly represented in this figure by a display device 1201 with the term "SELECT". The controller may be in the form of, for example, a processor with a program memory that comprises a set of instructions enabling the processor to carry out operations that will be described hereinafter.

The object identification system 1200 further comprises a compartment 1202, which may be in the form of a drawer, associated with a reader device. The diamonds with their object identification devices may be placed in this compartment 1202, which will hereinafter be referred to as drawer 1202 for reasons of convenience and illustration. To that end, a support 1203 may be used with slots, whereby an object identification device may be held in a slot, together with the diamond physically linked therewith.

The reader device of the object identification system 1200 comprises an antenna arrangement that is adapted to generate a relatively homogenous electromagnetic field in the compartment. Embodiments of such an antenna arrangement will be described hereinafter. Patent publication EP 1 911 125 also describes a suitable antenna arrangement.

Figure 13:
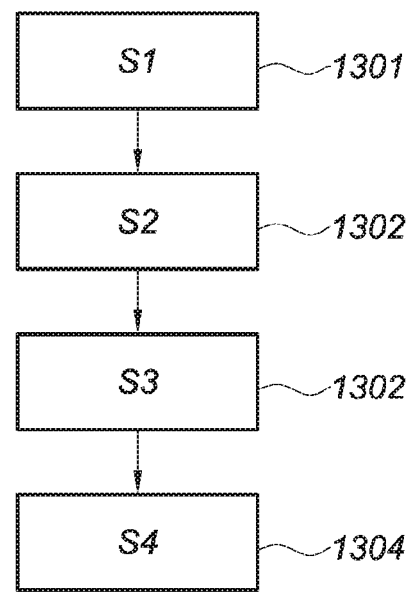
FIG. 13 is a flowchart-like diagram of a method of operating the object identification system.

FIG. 13 illustrates a method 1300 of operating the object identification system 1200 described hereinbefore with reference to FIG. 12. FIG. 13 represents the method 1300 in a flow chart like diagram. It is assumed that the controller can access a database that contains detailed information on the diamonds in the batch. The database may specify, for example, various characteristics of a diamond, information on the provenance of the diamond, entities that have already worked on the diamond, as well as entities that have been assigned to further work on the diamond.

In a first step 1301, the reader device of the object identification system 1200 may identify each diamond that is present in the drawer 1202. To that end, the reader device may generate an electromagnetic field in the drawer 1202 that enables the reader device to establish communications with respective RFID chips of respective object identification devices physically linked with respective diamonds in the drawer 1202. The reader device may then retrieve an identification data from an RFID chip in an object identification device that is present in the drawer 1202. The first step is thus an RFID scan that may produce a complete list of diamonds that are present in the drawer 1202. In a second step 1302, the object identification system 1200 may access the aforementioned database to retrieve, for each diamond that is present in the drawer 1202, the detailed information on this diamond. The object identification system 1200 may then present, on the display device 1201, an overview of different types of information that are available. This overview may be in the form of, for example, a table wherein respective columns relate to respective types of information and wherein respective lines relate to respective diamonds that are present in the drawer 1202.

In an alternative embodiment, an object identification device that is physically linked with a diamond may comprise detailed information on this diamond. For example, this information may be stored in the NFC chip that is comprised in the object identification device, or in the RFID chip, or in another circuit that has data storage capacity. In such an alternative embodiment, the object identification system 1200 may retrieve detailed information on the diamonds that are present in the drawer 1202, by interrogating the object identification devices that are physically linked with these diamonds.

In a third step 1303, the object identification system 1200 may receive one or more selection criteria from a user through a user interface. These selection criteria may relate to one or more types of information that have been retrieved from the database and presented to the user. The controller may then identify, in the list of diamonds that has been established, the diamonds that meet these selection criteria. These diamonds will hereinafter be referred to as selected diamonds for reasons of convenience and clarity. The controller thus establishes a list of selected diamonds, wherein each selected diamond has identification data in the RFID chip of the object identification device to which the diamond is physically linked.

In a fourth step 1304, the controller may cause the reader device to send specific commands to the object identification devices of the selected diamonds only. The controller may selectively address these object identification devices on the basis of the identification data that these contain. The specific commands reach the respective RFID chips of these object identification devices through the electromagnetic field and the respective RFID antennas of these devices.

The specific commands cause the LED of an object identification device that is physically linked to a selected diamond to light up. Accordingly, the user may visually identify the selected diamonds in the batch of diamonds. The user may then, for example, take the selected diamonds from the batch to form a particular group of diamonds that, for example, may require to be worked upon in a specific fashion. The method allows efficient and reliable sorting of diamonds based on one or more selection criteria.

Figure 14:
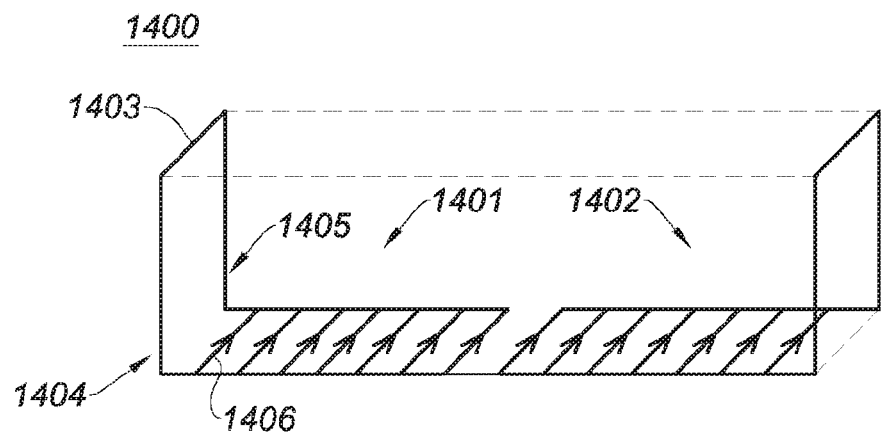
FIG. 14 is a schematic perspective view of a first embodiment of an antenna arrangement for an object identification system.
Figure 15:
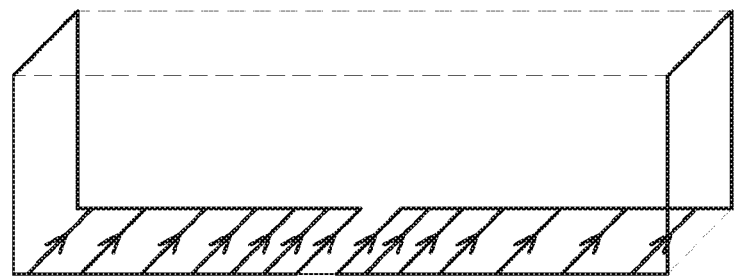
FIG. 15 is a schematic perspective view of a second embodiment of an antenna arrangement for an object identification system.

FIGS. 14 and 15 schematically illustrate two embodiments 1400, 1500 of an antenna arrangement for an object identification system, such as the object identification system 1200 illustrated in FIG. 12. FIG. 14 provides a perspective view of a first embodiment 1400. FIG. 15 provides a perspective view of a second embodiment 1500. The first embodiment 1400 may be incorporated in the drawer 1202 of the object identification system 1200 described hereinbefore with reference to FIG. 12, as well as in any other drawer of this system 1200. The same applies to the second embodiment 1500.

The first embodiment 1400 comprises two windings 1401, 1402 that face each other. One winding 1401 will hereinafter be referred to as left winding 1401, the other one as right winding 1402 for reasons of convenience and clarity. The right winding 1402 may be a mirrored version of the left winding 1401, with a plane of symmetry between these windings.

The left winding 1401 comprises a plurality of receptive turns that have respective dimensions. A turn comprises a horizontal upper segment 1403, a pair of L-shaped segments 1404, 1405 that face each other, and a horizontal lower segment 1406. The horizontal upper segment 1403 is conductively coupled between two respective upper ends of the pair of L-shaped segments 1404, 1405, one upper end belonging to one L-shaped segment 1404, the other end belonging to the other L-shaped segment 1405. The horizontal lower segment 1406 is conductively coupled between two respective lower ends of the pair of L-shaped segments 1404, 1405, one upper end belonging to one L-shaped segment 1404, the other end belonging to the other L-shaped segment 1405.

Respective horizontal upper segments 1403 and respective L-shaped segments 1404, 1405 belonging to respective turns may be located close to each other. For example, the respective horizontal upper segments 1403 may form, in effect, a bundle of wires. The same applies to the respective L-shaped segments 1404, 1405, which may form a pair of L-shaped bundles of wires. These bundles are represented by a single line in FIGS. 14 and 15 for reasons of convenience and clarity.

The L-shaped segments 1404, 1405 of a turn may each have a horizontal base portion that differs in length from that of other L-shaped segments belonging to other turns. As a result, respective lower horizontal segments 1406 may be spaced from each other forming a grid-like structure as illustrated in FIG. 14. This grid-like structure may be present on a bottom of the drawer 1202 mentioned hereinbefore. The grid-like structure allows generating a relatively homogenous electromagnetic field in the drawer 1202, which contributes to reliably causing a LED of an object identification device to light up. The remarks presented hereinbefore equally apply to the right winding 1402 of the first embodiment 1400, as well as to the left winding and the right winding of the second embodiment 1500 illustrated in FIG. 15.

In the first embodiment 1400 illustrated in FIG. 14, the respective lower horizontal segments 1406 may uniformly be spaced from each other, as illustrated in this figure. In the second embodiment 1500 illustrated in FIG. 15, the respective lower horizontal segments may non-uniformly be spaced from each other, as illustrated in this figure. There is a higher density of lower horizontal segments in a middle area of the antenna arrangement and a lower density in a boundary area. Such a non-uniform spacing may contribute to achieving a relatively homogenous electromagnetic field.

Notes

The detailed description hereinbefore with reference to the drawings is merely an illustration of various inventive concepts and additional features related to these concepts. The inventive concepts can be implemented in numerous different ways. In order to illustrate this, some alternatives are briefly indicated.

The inventive concepts may be applied in numerous types of products or methods related to object identification. For example, the invention may be applied in any type of added value chain in which various entities work on an object.

A first inventive concept concerns an object identification device comprising an RFID module comprising identification data, and an NFC assembly comprising data associated with the identification data comprised in the RFID module, the NFC assembly being adapted to transmit the data comprised therein to a consumer communication device having NFC capabilities. Additionally, but not mandatory, the object identification device may comprise visual indicator. In such an embodiment, the RFID module may be adapted to harvest power from an electromagnetic field and to continuously direct that power to the visual indicator upon reception of a command conveyed by the electromagnetic field.

A second inventive concept concerns the method described hereinbefore with reference to FIG. 13. The second inventive concept may be designated as "RFID sorting". The RFID sorting concept may be applied to a batch of respective objects that are provided with respective object identification devices, whereby an object identification device comprises a visual indicator, such as, for example, a LED. First, an inventory of the respective objects is made by means of RFID, which retrieves respective identification data from the respective object identification devices. This identification data is used for obtaining descriptive data relating to various characteristics of the objects; descriptive data relating to an object may specify various characteristics that this object has. A selection criterion may be defined on the basis of one or more characteristics. The objects that meet the selection criterion are selected. The object identification devices associated with these selected objects received a command, which may be in the form of a signal, or a set of signals, which causes the LEDs of these object identification devices to light up, that is, to provide a visual indication.

A third inventive concept concerns the power supply circuit illustrated in FIG. 10. The third inventive concept may be designated as "LED power circuit". A power supply circuit of a passive RFID device, which harvests energy from an electromagnetic field, may be set in at least two states. One of these states is a "normal state" in which the harvested energy is entirely, or almost entirely, directed to RFID circuitry. Another state is a "LED on" state in which the harvested energy is entirely, or almost entirely, directed to a visual indicator, such as, for example, an LED. This may prevent RFID communication, and may even prevent proper functioning of the RFID circuitry. The power supply circuit may be adapted to set itself in the normal state after an interruption in the electromagnetic field, that is, when the electromagnetic field is present again. The method illustrated in FIG. 11 is related to the "LED power circuit" inventive concept.

A fourth inventive concept concerns an antenna arrangement as illustrated in FIGS. 14 and 15. The fourth inventive concept may be designated as "homogeneous field generating antenna". Two windings face each other. A winding comprises various respective turns. The respective turns of a winding are kinked along a common line and have respective segments that overlap with each other and respective non-overlapping segments that form a grid-like structure, as illustrated in FIGS. 14 and 15. Each of these inventive concepts can be applied independently of the other inventive concepts. For example, an object identification device according to the first inventive concept does not require a context wherein the inventive concepts of RFID sorting, LED power circuit, and homogeneous field generating antenna are used.

The term "LED" should be understood in a broad sense. The term may embrace any element or structure that electrically can be made to produce light or any other visual indication.

In general, there are numerous different ways of implementing the inventive concepts, whereby different implementations may have different topologies. In any given topology, a single module may carry out several functions, or several modules may jointly carry out a single function. In this respect, the drawings are very diagrammatic. There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

There are numerous ways of storing and distributing a set of instructions, that is, software, which allows carrying out a method in accordance with the invention. For example, software may be stored in a suitable device readable medium, such as, for example, a memory circuit, a magnetic disk, or an optical disk. A device readable medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. An object identification device comprising:
a visual indicator;
an RFID module comprising identification data and a power supply circuit adapted to harvest power from an electromagnetic field; and
an NFC assembly comprising data associated with the identification data comprised in the RFID module, the NFC assembly being adapted to transmit the data comprised therein to a consumer communication device having NFC capabilities,
wherein the power supply circuit is adapted to operate in a normal state in which the power harvested from the electromagnetic field is continuously directed to RFID circuitry and, upon reception of a command conveyed by the electromagnetic field, in a visual indication state in which the power harvested from the electromagnetic field is continuously directed to the visual indicator, the power supply circuit being adapted to set itself in the normal state after an interruption in the electromagnetic field.

2. An object identification device according to claim 1, wherein the RFID module comprises an integrated circuit that forms part of a chip-on-board assembly, the chip-on-board assembly further comprising the visual indicator.

3. An object identification device according to claim 1, wherein the object identification device is in the form of a card, the visual indicator being located in a corner of the card.

4. An object identification device according to claim 3, wherein the RFID module comprises an antenna that is situated in a circumferential periphery of the card, and wherein the NFC assembly comprises an antenna that is situated inside the circumferential periphery.

5. An object identification device according to claim 1, wherein the RFID module is adapted to operate in a frequency range comprised between 50 and 250 kHz.

6. An object identification device according to claim 1, wherein the power supply circuit comprises a switch coupled in series with the visual indicator, the switch being open in the normal state and closed in the visual indication state.

7. An object identification system comprising a reader device adapted to communicate with the RFID module in an object identification device according to claim 1.

8. A method of working on objects involving an object identification device comprising:
- a visual indicator;
- an RFID module comprising identification data and a power supply circuit adapted to harvest power from an electromagnetic field; and
- an NFC assembly comprising data associated with the identification data comprised in the RFID module, the NFC assembly being adapted to transmit the data comprised therein to a consumer communication device having NFC capabilities,
- wherein the power supply circuit is adapted to operate in a normal state in which the power harvested from the electromagnetic field is continuously directed to RFID circuitry and, upon reception of a command conveyed by the electromagnetic field, in a visual indication state in which the power harvested from the electromagnetic field is continuously directed to the visual indicator, the power supply circuit being adapted to set itself in the normal state after an interruption in the electromagnetic field.

* * * * *